(12) United States Patent
Lunden et al.

(10) Patent No.: US 9,113,339 B2
(45) Date of Patent: Aug. 18, 2015

(54) APPARATUS AND METHOD FOR ALLOCATING COMMUNICATION RESOURCES IN A COMMUNICATION SYSTEM

(75) Inventors: Jari Lunden, Espoo (FI); Elena Virtej, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 137 days.

(21) Appl. No.: 13/978,618

(22) PCT Filed: Jan. 26, 2011

(86) PCT No.: PCT/IB2011/050350
§ 371 (c)(1), (2), (4) Date: Aug. 29, 2013

(87) PCT Pub. No.: WO2012/101482
PCT Pub. Date: Aug. 2, 2012

(65) Prior Publication Data
US 2014/0295873 A1    Oct. 2, 2014

(51) Int. Cl.
H04W 72/00    (2009.01)
H04W 16/14    (2009.01)
(Continued)

(52) U.S. Cl.
CPC ............ *H04W 16/14* (2013.01); *H04W 52/146* (2013.01); *H04W 52/241* (2013.01);
(Continued)

(58) Field of Classification Search
CPC ... H04W 16/14; H04W 24/10; H04W 52/146; H04W 52/241; H04W 52/242; H04W 52/246; H04W 52/38; H04W 72/082

USPC ........................... 455/454, 453, 452.2, 452.1
See application file for complete search history.

(56) References Cited

U.S. PATENT DOCUMENTS 8,150,478 B2 * 4/2012 Perets et al. ................... 455/574
2009/0197590 A1 * 8/2009 Borran et al. ................. 455/423
(Continued)

FOREIGN PATENT DOCUMENTS

EP    1773085 A1    4/2007
WO    0057658 A1    9/2000
(Continued)

OTHER PUBLICATIONS

International Search Report and Written Opinion received for corresponding Patent Cooperation Treaty Application No. PCT/IB2011/050350, dated Oct. 18, 2011, 13 pages.
(Continued)

*Primary Examiner* — Khai M Nguyen
(74) *Attorney, Agent, or Firm* — Squire Patton Boggs (US) LLP

(57) ABSTRACT

An apparatus, method and system for allocating communication resources in a communication system. In one embodiment, an apparatus includes a processor 520 and memory 550 including computer program code. The memory 550 and the computer program code are configured to, with the processor 520, cause the apparatus to compute a transmitter power level for a user equipment on a communication resource allocated to a neighboring base station to limit interference for communications in an area served by the neighboring base station below a first threshold level, compute a signal-to-interference-and-noise ratio for an uplink communication by the user equipment employing the transmitter power level on the communication resource within an area served by the apparatus, and assign a subframe of the communication resource to the user equipment if the signal-to-interference-and-noise ratio for the uplink communication is greater than a second threshold level.

12 Claims, 9 Drawing Sheets

(51) Int. Cl.
H04W 52/14 (2009.01)
H04W 52/24 (2009.01)
H04W 72/08 (2009.01)
H04W 52/38 (2009.01)
H04W 24/10 (2009.01)

(52) U.S. Cl.
CPC .......... *H04W52/242* (2013.01); *H04W 52/246* (2013.01); *H04W 52/38* (2013.01); *H04W 72/082* (2013.01); *H04W 24/10* (2013.01)

(56) References Cited

U.S. PATENT DOCUMENTS

2009/0325626 A1* 12/2009 Palanki et al. ................ 455/522
2011/0028170 A1 2/2011 Sawai

FOREIGN PATENT DOCUMENTS

| WO | 2009050210 A1 | 4/2009 |
| WO | 2009050212 A1 | 4/2009 |
| WO | 2010137777 A1 | 12/2010 |

OTHER PUBLICATIONS

Lunden et al., "Coordination Between Access points in Distributed flexible Spectrum Use," Personal, Indoor and Mobile Radio Communications, IEEE 20th International Symposium, Sep. 2009, pp. 666-670.

Lunden et al., "Distributed Flexible Spectrum use for Uncoordinated Scenarios," Personal, Indoor and Mobile Radio Communications, IEEE 20th International Symposium, Sep. 2009, pp. 2871-2875.

Oksanen et al., "Diversity-Based Spectrum Sensing Policy for Detecting Primary Signals Over Multiple Frequency Bands," Acoustics Speech and Signal Processing (ICASSP), IEEE International Conference, Mar. 2010, pp. 3130-3133.

3GPP TSG RAN WG1 Meeting #43, R1-051341, "Flexible Fractional Frequency Reuse Approach", Seoul, Korea, Nov. 2005.

* cited by examiner

APPARATUS AND METHOD FOR ALLOCATING COMMUNICATION RESOURCES IN A COMMUNICATION SYSTEM

RELATED APPLICATION

This application was originally filed as Patent Cooperation Treaty Application No. PCT/IB2011/050350 filed Jan. 26, 2011.

TECHNICAL FIELD

The present invention is directed, in general, to communication systems and, in particular, to an apparatus, method and system to allocate communication resources in a communication system.

BACKGROUND

Long term evolution ("LTE") of the Third Generation Partnership Project ("3GPP"), also referred to as 3GPP LTE, refers to research and development involving the 3GPP LTE Release 8 and beyond, which is the name generally used to describe an ongoing effort across the industry aimed at identifying technologies and capabilities that can improve systems such as the universal mobile telecommunication system ("UMTS"). The notation "LTE-A" is generally used in the industry to refer to further advancements in LTE. The goals of this broadly based project include improving communication efficiency, lowering costs, improving services, making use of new spectrum opportunities, and achieving better integration with other open standards.

The evolved universal terrestrial radio access network ("E-UTRAN") in 3GPP includes base stations providing user plane (including packet data convergence protocol/radio link control/media access control/physical ("PDCP/RLC/MAC/PHY") sublayers) and control plane (including a radio resource control ("RRC") sublayer) protocol terminations towards wireless communication devices such as cellular telephones. A wireless communication device or terminal is generally known as user equipment (also referred to as "UE"). A base station is an entity of a communication network often referred to as a Node B or an NB. Particularly in the E-UTRAN, an "evolved" base station is referred to as an eNodeB or an eNB. For details about the overall architecture of the E-UTRAN, see 3GPP Technical Specification ("TS") 36.300 v8.7.0 (2008-12), which is incorporated herein by reference. For details of the radio resource control management, see 3GPP TS 25.331 v.9.1.0 (2009-12) and 3GPP TS 36.331 v.9.1.0 (2009-12), which are incorporated herein by reference.

As wireless communication systems such as cellular telephone, satellite, and microwave communication systems become widely deployed and continue to attract a growing number of users, there is a pressing need to accommodate a large and variable number of communication devices that transmit an increasing quantity of data within a fixed spectral allocation and limited transmit power. The increased quantity of data is a consequence of wireless communication devices transmitting video information and surfing the Internet, as well as performing ordinary voice communications. Such processes must be performed while accommodating substantially simultaneous operation of a large number of wireless communication devices.

To provide improved capability to transmit an increasing quantity of data, future communication systems such as cellular communication systems are expected to implement a distributed flexible spectrum use ("FSU") mechanism. With flexible spectrum use, the base stations of the communication system coordinate reuse of communication resources (e.g. radio communication resources) in a distributed way (i.e., without the use of a central control element) to improve a performance characteristic of the communication system such as fairness, capacity, and efficiency, or some other measure of performance. As a benefit, such a communication system does not require frequency planning or other traditional planning techniques. Instead, the communication system arranges sharing of spectrum communication resources in a self-organizing manner. Hence, flexible spectrum use is especially suited for local area deployments that will likely include small, multiple, overlapping areas (such as cells), placed without overall coordination, possibly by the end users of wireless communication devices themselves.

Due to the uncoordinated nature of communication system deployments, particularly of indoor cellular deployments, self-optimization mechanisms are employed to distribute communication resources among the base stations. For this purpose, a flexible spectrum use scheme may be deployed. In present flexible spectrum use scheduling arrangements operating on cell level, a base station's communication resource reservation inventory is allocated with worst-case uplink ("UL") interference in mind, which may be unnecessarily restrictive from the perspective of what communication resources may be allocated.

In view of the growing deployment of communication systems such as cellular communication systems and the growing utilization bandwidth for video and other bandwidth-intensive applications, it would be beneficial in the utilization of flexible spectrum use scheduling arrangements to employ a system and method that accounts for interference between wireless communication devices in an area served by one base station and wireless communication devices in an area served by another base station that avoids the deficiencies of current communication systems.

SUMMARY OF THE INVENTION

These and other problems are generally solved or circumvented, and technical advantages are generally achieved, by embodiments of the present invention, which include an apparatus, method and system to allocate communication resources in a communication system. In one embodiment, an apparatus includes a processor and memory including computer program code. The memory and the computer program code are configured to, with the processor, cause the apparatus to compute a transmitter power level for a user equipment on a communication resource allocated to a neighboring base station to limit interference for communications in an area served by the neighboring base station below a first threshold level, compute a signal-to-interference-and-noise ratio for an uplink communication by the user equipment employing the transmitter power level on the communication resource within an area served by the apparatus, and assign a subframe of the communication resource to the user equipment if the signal-to-interference-and-noise ratio for the uplink communication is greater than a second threshold level.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention. In view of the foregoing, the present invention will be described with respect to exemplary embodiments in a specific context of an apparatus, method and system to utilize a communication resource or a portion thereof that may not be included in an inventory allocated to a serving base station. The apparatus, method and system are applicable, without limitation, to any communication system including existing and future 3GPP technologies such as UMTS, LTE, and its future variants such as 4th generation ("4G") communication systems.

Figure 1:
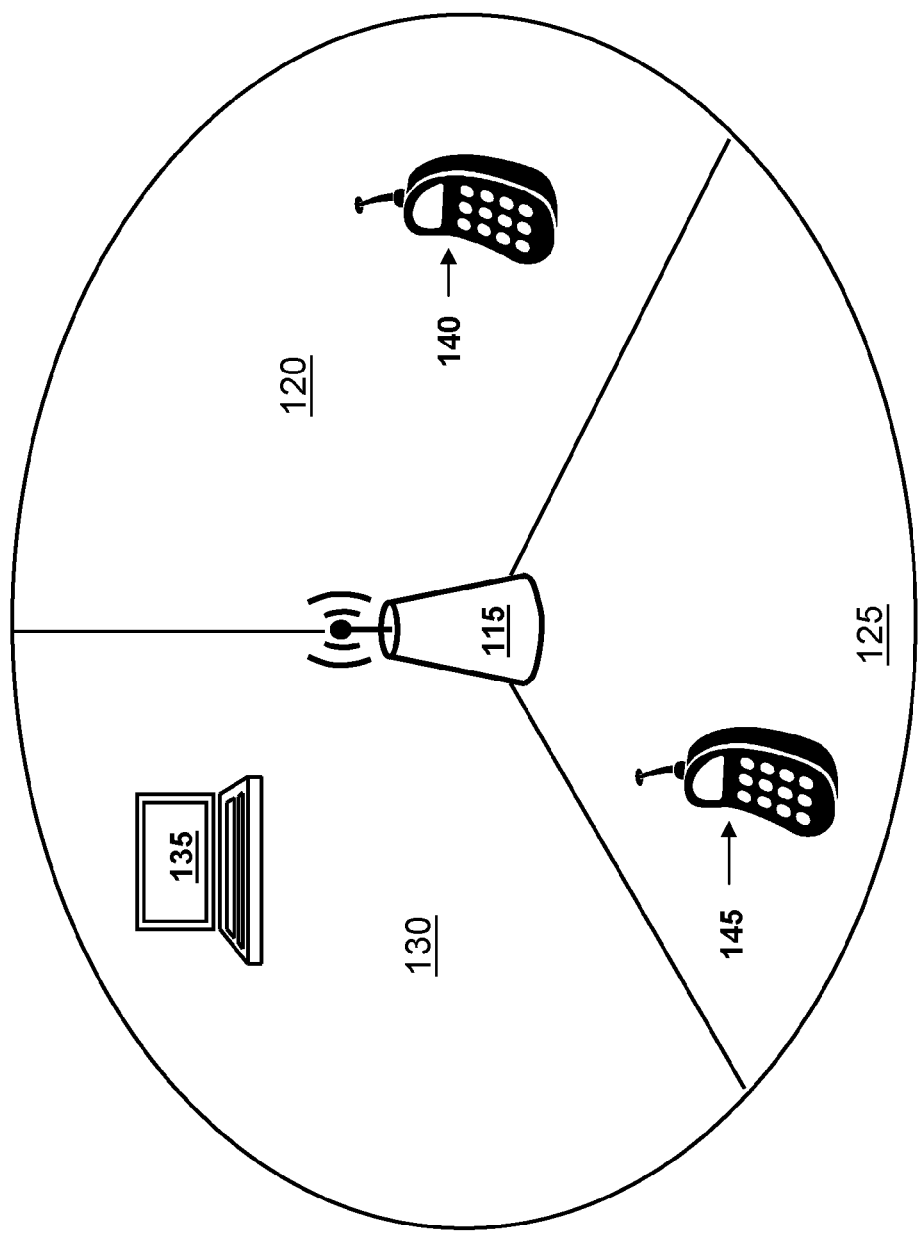
FIGS. 1 and 2 illustrate system level diagrams of embodiments of communication systems including a base station and wireless communication devices that provide an environment for application of the principles of the present invention.

Turning now to FIG. 1, illustrated is a system level diagram of an embodiment of a communication system including a base station 115 and wireless communication devices (e.g., user equipment) 135, 140, 145 that provides an environment for application of the principles of the present invention. The base station 115 is coupled to a public switched telephone network (not shown). The base station 115 is configured with a plurality of antennas to transmit and receive signals in a plurality of sectors including a first sector 120, a second sector 125, and a third sector 130, each of which typically spans 120 degrees. The three sectors or more than three sectors are configured per frequency, and one base station 115 can support more than one frequency. Although FIG. 1 illustrates one wireless communication device (e.g., wireless communication device 140) in each sector (e.g. the first sector 120), a sector (e.g. the first sector 120) may generally contain a plurality of wireless communication devices. In an alternative embodiment, a base station 115 may be formed with only one sector (e.g. the first sector 120), and multiple base stations may be constructed to transmit according to co-operative multi-input/multi-output ("C-MIMO") operation, etc.

The sectors (e.g. the first sector 120) are formed by focusing and phasing radiated signals from the base station antennas, and separate antennas may be employed per sector (e.g. the first sector 120). The plurality of sectors 120, 125, 130 increases the number of subscriber stations (e.g., the wireless communication devices 135, 140, 145) that can simultaneously communicate with the base station 115 without the need to increase the utilized bandwidth by reduction of interference that results from focusing and phasing base station antennas. While the wireless communication devices 135, 140, 145 are part of a primary communication system, the wireless communication devices 135, 140, 145 and other devices such as machines (not shown) may be a part of a secondary communication system to participate in, without limitation, D2D and machine-to-machine communications or other communications.

Figure 2:
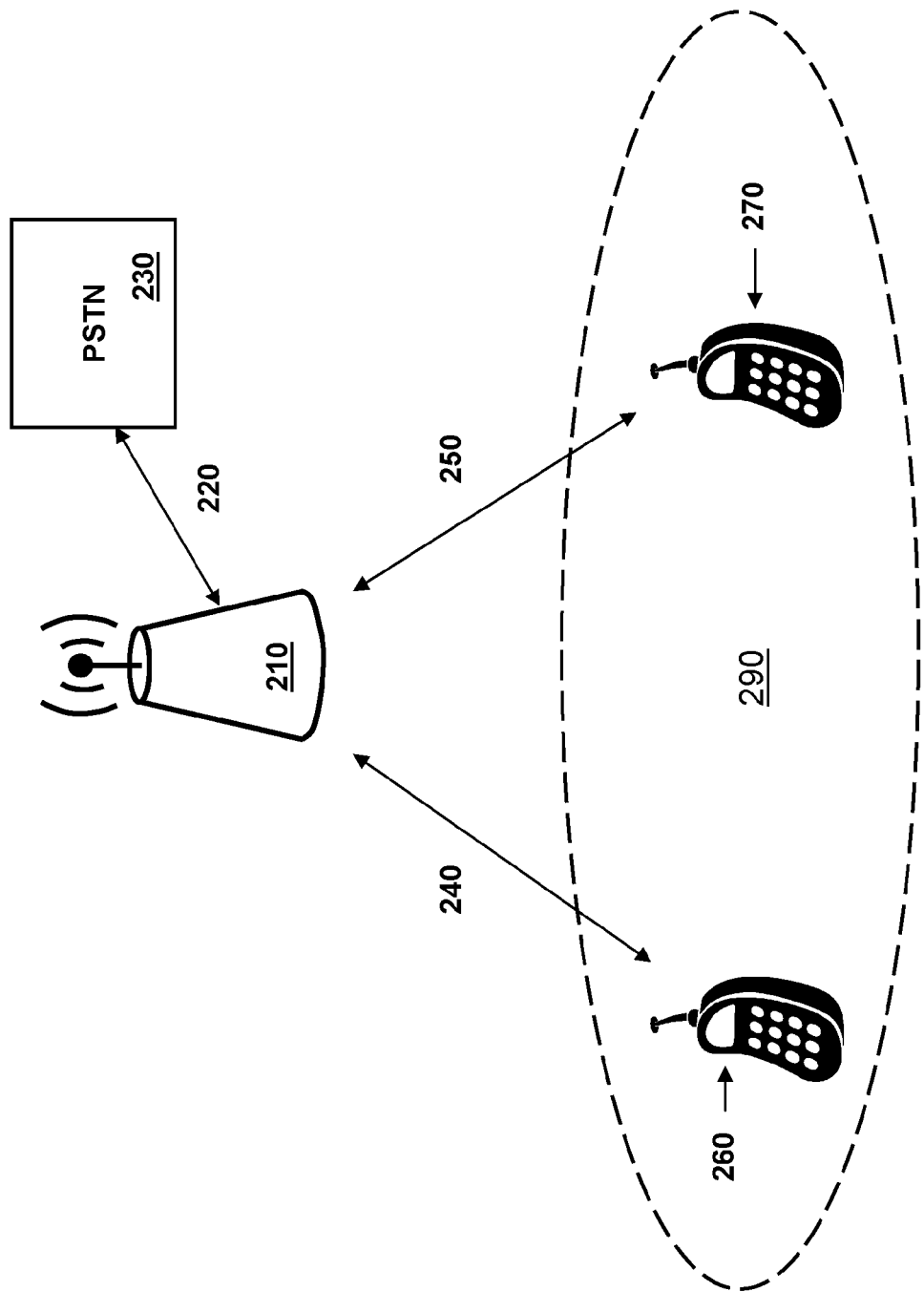

Turning now to FIG. 2, illustrated is a system level diagram of an embodiment of a communication system including a base station 210 and wireless communication devices (e.g., user equipment) 260, 270 that provides an environment for application of the principles of the present invention. The communication system includes the base station 210 coupled by communication path or link 220 (e.g., by a fiber-optic communication path) to a core telecommunications network such as public switched telephone network ("PSTN") 230. The base station 210 is coupled by wireless communication paths or links 240, 250 to the wireless communication devices 260, 270, respectively, that lie within its cellular area 290.

In operation of the communication system illustrated in FIG. 2, the base station 210 communicates with each wireless communication device 260, 270 through control and data communication resources allocated by the base station 210 over the communication paths 240, 250, respectively. The control and data communication resources may include frequency and time-slot communication resources in frequency division duplex ("FDD") and/or time division duplex ("TDD") communication modes. While the wireless communication devices 260, 270 are part of a primary communication system, the wireless communication devices 260, 270 and other devices such as machines (not shown) may be a part of a secondary communication system to participate in, without limitation, device-to-device and machine-to-machine communications or other communications.

Figure 3:
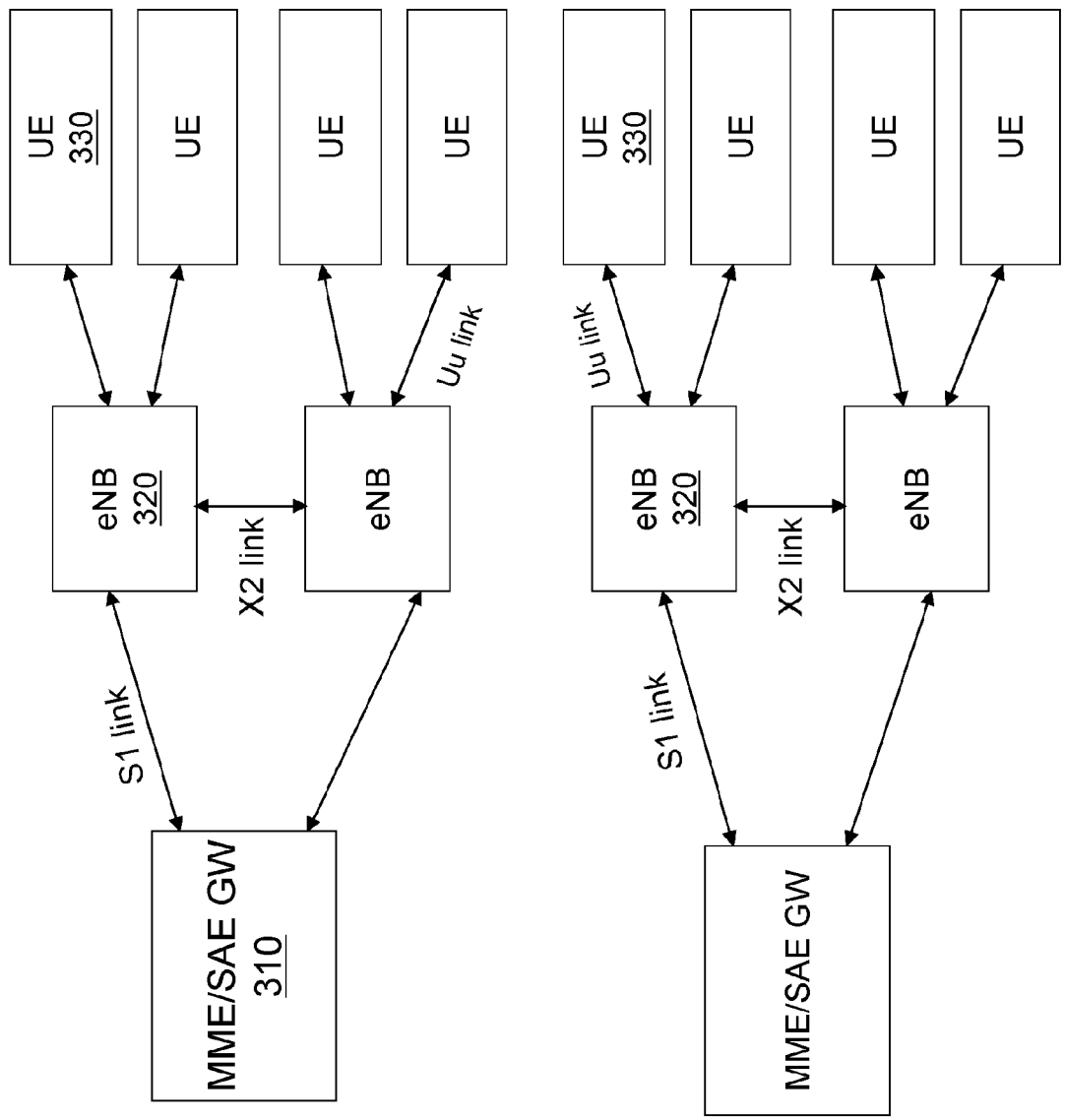
FIGS. 3 and 4 illustrate system level diagrams of embodiments of communication systems including wireless communication systems that provide an environment for application of the principles of the present invention.

Turning now to FIG. 3, illustrated is a system level diagram of an embodiment of a communication system including a wireless communication system that provides an environment for the application of the principles of the present invention. The wireless communication system may be configured to provide evolved UMTS terrestrial radio access network ("E-UTRAN") universal mobile telecommunications services. A mobile management entity/system architecture evolution gateway ("MME/SAE GW," one of which is designated 310) provides control functionality for an E-UTRAN node B (designated "eNB," an "evolved node B," also referred to as a "base station," one of which is designated 320) via an S1 communication link (ones of which are designated "S1 link"). The base stations 320 communicate via X2 communication links (ones of which are designated "X2 link"). The various communication links are typically fiber, microwave, or other high-frequency communication paths such as coaxial links, or combinations thereof. In the case that there is no X2 interface or communication links between the base stations, there may be some over-the-air communication therebetween.

The base stations 320 communicate with wireless communication devices such as user equipment ("UE," ones of which are designated 330), which is typically a mobile transceiver carried by a user. Thus, the communication links (designated "Uu" communication links, ones of which are designated "Uu link") coupling the base stations 320 to the user equipment 330 are air links employing a wireless communication signal such as, for example, an orthogonal frequency division multiplex ("OFDM") signal. While the user equipment 330 are part of a primary communication system, the user equipment 330 and other devices such as machines (not shown) may be a part of a secondary communication system to participate in, without limitation, D2D and machine-to-machine communications or other communications.

Figure 4:
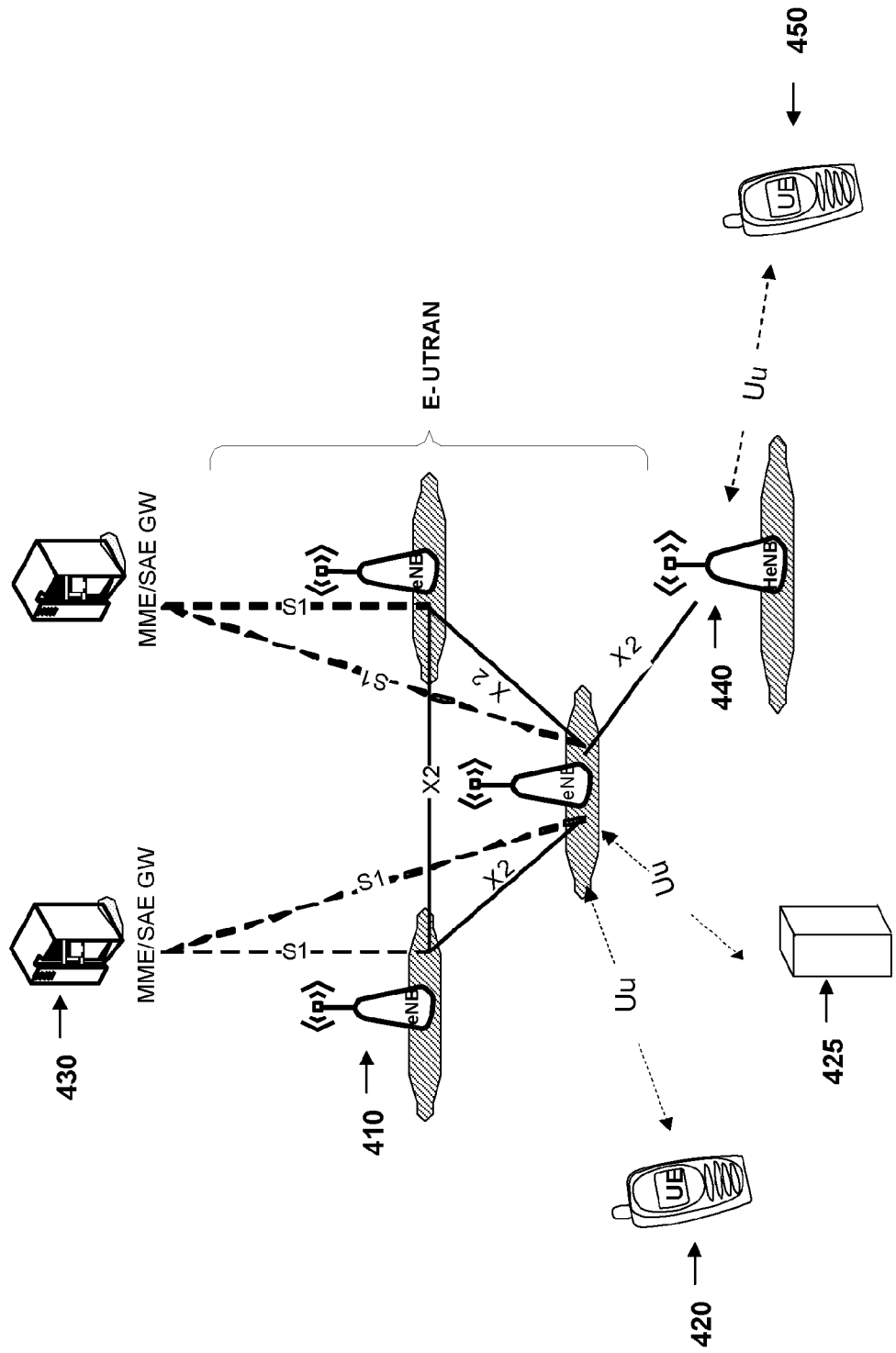

Turning now to FIG. 4, illustrated is a system level diagram of an embodiment of a communication system including a wireless communication system that provides an environment for the application of the principles of the present invention. The wireless communication system provides an E-UTRAN architecture including base stations (one of which is designated 410) providing E-UTRAN user plane (packet data convergence protocol/radio link control/medium access control/physical layer) and control plane (radio resource control/ radio link control/medium access control/physical layer) protocol terminations towards wireless communication devices such as user equipment 420 and other devices such as machines 425 (e.g., an appliance, television, meter, etc.). The base stations 410 are interconnected with X2 interfaces or communication links (designated "X2"). The base stations 410 are also connected by S1 interfaces or communication links (designated "S1") to an evolved packet core ("EPC") including a mobile management entity/system architecture evolution gateway ("MME/SAE GW," one of which is designated 430). The S1 interface supports a multiple entity relationship between the mobile management entity/system architecture evolution gateway 430 and the base stations 410. For applications supporting inter-public land mobile handover, inter-eNB active mode mobility is supported by the mobile management entity/system architecture evolution gateway 430 relocation via the S1 interface.

The base stations 410 may host functions such as radio resource management. For instance, the base stations 410 may perform functions such as internet protocol ("IP") header compression and encryption of user data streams, ciphering of user data streams, radio bearer control, radio admission control, connection mobility control, dynamic allocation of communication resources to user equipment in both the uplink and the downlink, selection of a mobility management entity at the user equipment attachment, routing of user plane data towards the user plane entity, scheduling and transmission of paging messages (originated from the mobility management entity), scheduling and transmission of broadcast information (originated from the mobility management entity or operations and maintenance), and measurement and reporting configuration for mobility and scheduling. The mobile management entity/system architecture evolution gateway 430 may host functions such as distribution of paging messages to the base stations 410, security control, termination of user plane packets for paging reasons, switching of user plane for support of the user equipment mobility, idle state mobility control, and system architecture evolution bearer control. The user equipment 420 and machines 425 receive an allocation of a group of information blocks from the base stations 410.

Additionally, the ones of the base stations 410 are coupled a home base station 440 (a device), which is coupled to devices such as user equipment 450 and/or machines (not shown) for a secondary communication system. The base station 410 can allocate secondary communication system resources directly to the user equipment 450 and machines, or to the home base station 440 for communications (e.g., local or D2D communications) within the secondary communication system. The secondary communication resources can overlap with communication resources employed by the base station 410 to communicate with the user equipment 420 within its serving area. For a better understanding of home base stations (designated "HeNB"), see 3 GPP TS 32.781 v.9.1.0 (2010-03), which is incorporated herein by reference. While the user equipment 420 and machines 425 are part of a primary communication system, the user equipment 420, machines 425 and home base station 440 (communicating with other user equipment 450 and machines (not shown)) may be a part of a secondary communication system to participate in, without limitation, D2D and machine-to-machine communications or other communications.

Figure 5:
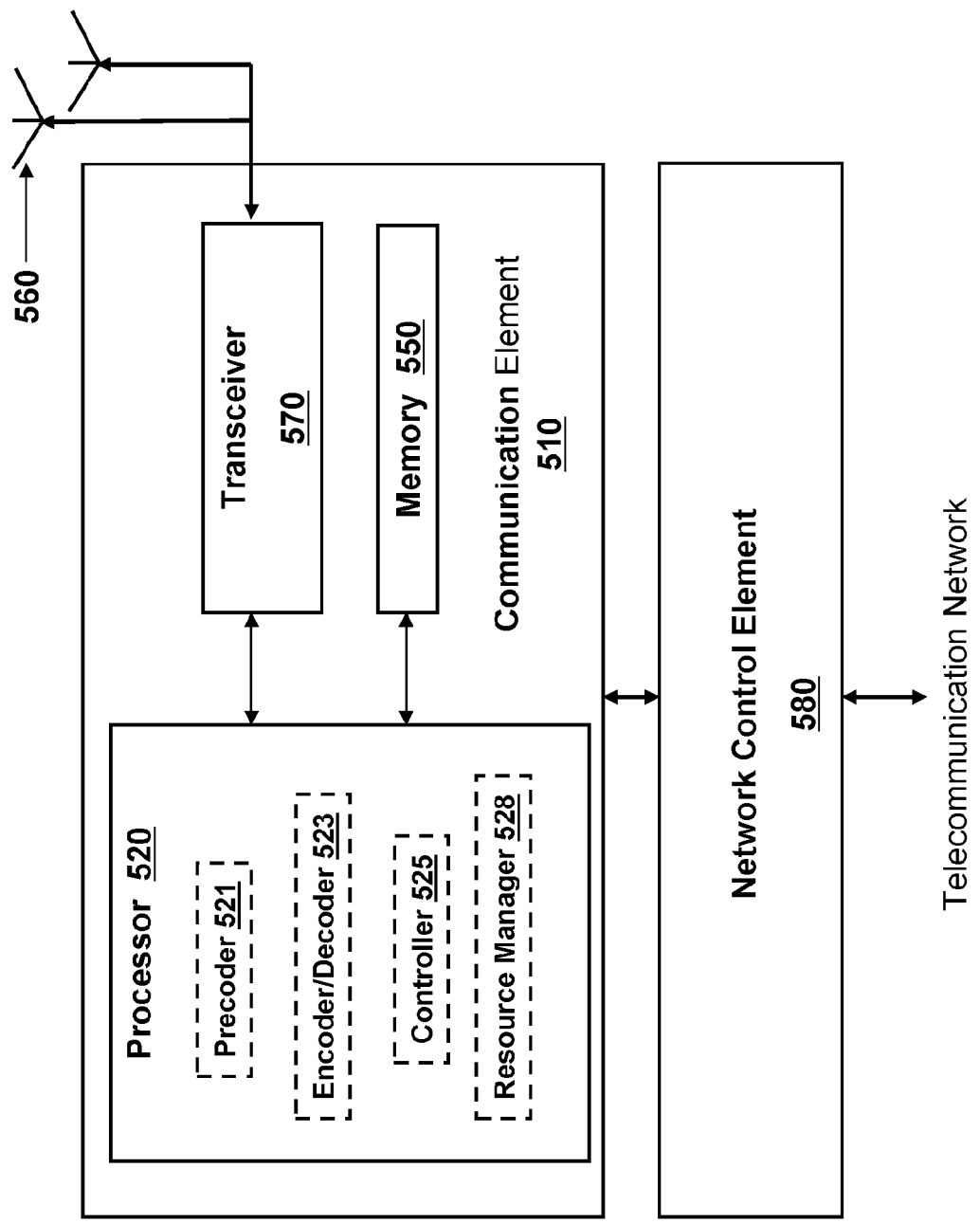
FIG. 5 illustrates a system level diagram of an embodiment of a communication element of a communication system for application of the principles of the present invention.

Turning now to FIG. 5, illustrated is a system level diagram of an embodiment of a communication element 510 of a communication system for application of the principles of the present invention. The communication element or device 510 may represent, without limitation, a base station, a wireless communication device (e.g., a subscriber station, terminal, mobile station, user equipment, machine), a network control element, a communication node, or the like. When the communication element or device 510 represents a user equipment, the user equipment may be configured to communicate with another user equipment employing one or more base stations as intermediaries in the communication path (referred to as cellular communications). The user equipment may also be configured to communicate directly with another user equipment without direct intervention of the base station in the communication path (referred to as device-to-device ("D2D") communications). The communication element 510 includes, at least, a processor 520, memory 550 that stores programs and data of a temporary or more permanent nature, an antenna 560, and a radio frequency transceiver 570 coupled to the antenna 560 and the processor 520 for bidirectional wireless communications. The communication element 510 may be formed with a plurality of antennas to enable a multiple-input multiple output ("MIMO") mode of operation. The communication element 510 may provide point-to-point and/or point-to-multipoint communication services.

The communication element 510, such as a base station in a cellular communication system or network, may be coupled to a communication network element, such as a network control element 580 of a public switched telecommunication network ("PSTN"). The network control element 580 may, in turn, be formed with a processor, memory, and other electronic elements (not shown). The network control element 580 generally provides access to a telecommunication network such as a PSTN. Access may be provided using fiber optic, coaxial, twisted pair, microwave communications, or similar link coupled to an appropriate link-terminating element. A communication element 510 formed as a wireless communication device is generally a self-contained device intended to be carried by an end user.

The processor 520 in the communication element 510, which may be implemented with one or a plurality of processing devices, performs functions associated with its operation including, without limitation, precoding of antenna gain/phase parameters (precoder 521), encoding and decoding (encoder/decoder 523) of individual bits forming a communication message, formatting of information, and overall control (controller 525) of the communication element 510. Exemplary functions related to management of communication resources include, without limitation, hardware installation, traffic management, performance data analysis, tracking of end users and equipment, configuration management, end user administration, management of wireless communication devices, management of tariffs, subscriptions, security, billing and the like.

For instance, in accordance with the memory 550, the resource manager 528 of the processor 520 is configured to allocate primary and second communication resources (e.g., time and frequency communication resources) for transmission of voice communications and data to/from the communication element 510 and to format messages including the communication resources therefor in a primary and secondary communication system. In accordance therewith, the resource manager 528 of the processor 520 is configured to allocate communication resources (or a portion thereof) from an inventory of communication resources for another serving area (i.e., communication resources not assigned or allocated to a serving area) to a wireless communication device in the serving area. As an example, if the communication element 510 is a base station serving a wireless communication device in its serving area, the resource manager 528 is configured to assign communication resources (or a portion thereof) allocated to another base station to the wireless communication device within its serving area. Thus, the resource manager 528 is configured to assign or allocate communication resources not typically allocated thereto to a wireless communication device.

The execution of all or portions of particular functions or processes related to management of communication resources may be performed in equipment separate from and/or coupled to the communication element 510, with the results of such functions or processes communicated for execution to the communication element 510. The processor 520 of the communication element 510 may be of any type suitable to the local application environment, and may include one or more of general-purpose computers, special purpose computers, microprocessors, digital signal processors ("DSPs"), field-programmable gate arrays ("FPGAs"), application-specific integrated circuits ("ASICs"), and processors based on a multi-core processor architecture, as non-limiting examples.

The transceiver 570 of the communication element 510 modulates information on to a carrier waveform for transmission by the communication element 510 via the antenna(s) 560 to another communication element. The transceiver 570 demodulates information received via the antenna(s) 560 for further processing by other communication elements. The transceiver 570 is capable of supporting duplex operation for the communication element 510.

The memory 550 of the communication element 510, as introduced above, may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. The programs stored in the memory 550 may include program instructions or computer program code that, when executed by an associated processor, enable the communication element 510 to perform tasks as described herein. Of course, the memory 550 may form a data buffer for data transmitted to and from the communication element 510. Exemplary embodiments of the system, subsystems, and modules as described herein may be implemented, at least in part, by computer software executable by processors of, for instance, the wireless communication device and the base station, or by hardware, or by combinations thereof. As will become more apparent, systems, subsystems and modules may be embodied in the communication element 510 as illustrated and described herein.

As described previously above, due to the possibly uncoordinated nature of communication system such as cellular communication system deployments, self-optimization mechanisms such as flexible spectrum use are employed to distribute communication resources such as time and frequency resource elements among base stations. Flexible spectrum use operation is based on creating and spreading local awareness in the communication system, which allows intelligent, self-organizing, flexible spectrum use. In practice, this is implemented using base station beaconing, wherein each base station broadcasts flexible spectrum use beacons containing information on its spectrum use, priority, and other flexible spectrum use-related information. A base station is the functional access point ("AP") between user equipment and the communication system. Nearby user equipment (even if connected to another base station) can monitor these beacons to collect information describing spectrum use at their location. The user equipment then report their findings to their serving base stations, which combine information from connected user equipment to form local awareness of spectrum use in the serving area and (possibly) other areas (e.g., neighboring cells), and can take action to allocate or otherwise utilize communication resources (e.g., to reserve more communication resources for the serving area).

Figure 6:
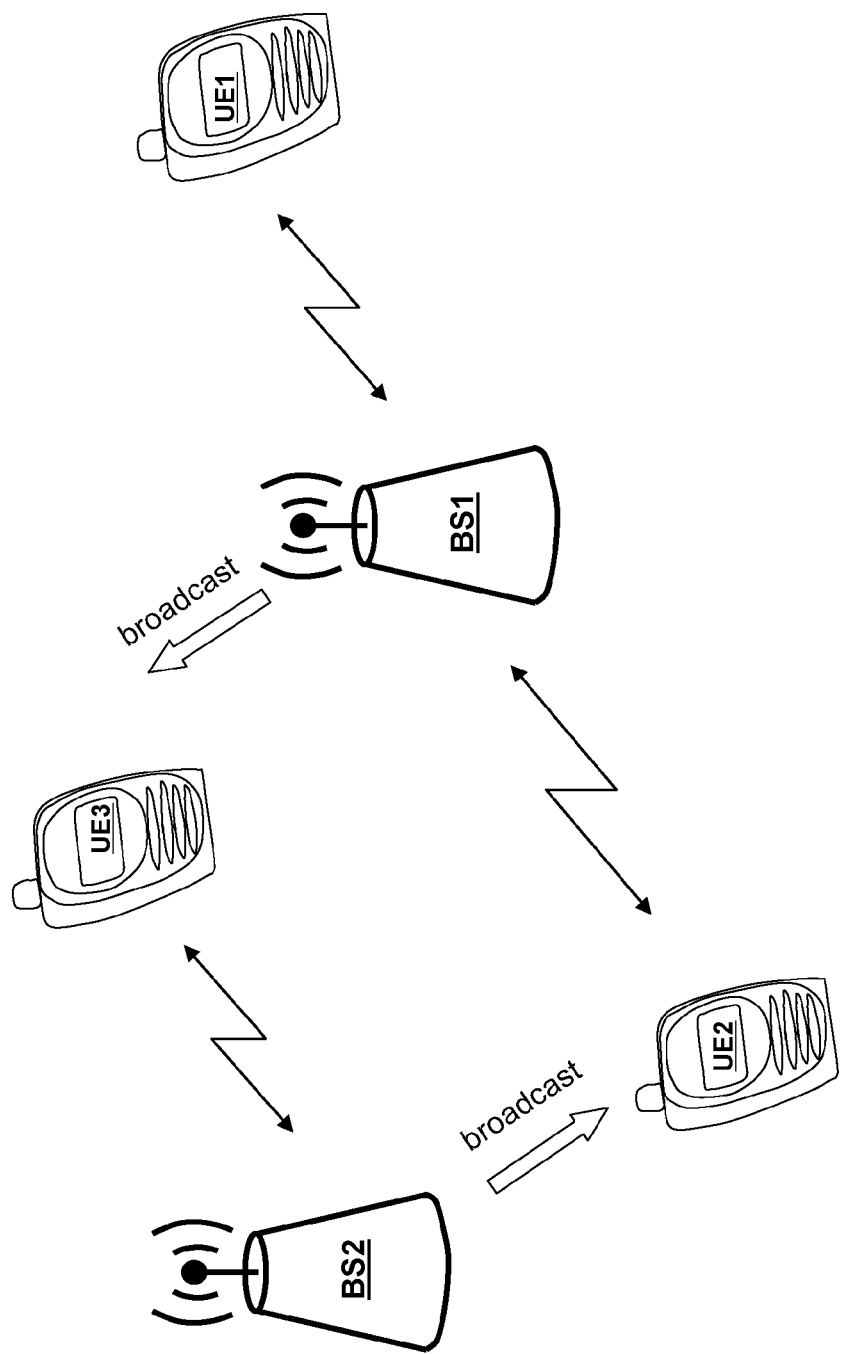
FIG. 6, illustrated is a graphical representation of an embodiment of a communication system illustrating exemplary flexible spectrum use by first and second base stations that provides an environment for the application of the principles of the present invention.

Turning now to FIG. 6, illustrated is a system level diagram of an embodiment of a communication system illustrating exemplary flexible spectrum use by first and second base stations BS1, BS2 that provides an environment for the application of the principles of the present invention. Each base station BS1, BS2 broadcasts information, such as in a system information broadcast or by point-to-point communication to user equipment, describing spectrum use to user equipment within the respective serving areas. For example, first and second user equipment UE1, UE2 are served by the first base station BS1, and a third user equipment UE3 is served by the second base station BS2. The information transmitted by a base station may contain a base station identification number ("BSID"), reserved communication resources (e.g. an inventory of communication resources), and an indication of spectrum coordination support. The user equipment receive beacons of neighboring base stations and also possibly of their serving base stations and report the obtained information to their respective serving base station. As illustrated in FIG. 6, the second user equipment UE2 receives a broadcast from the second base station BS2, which is not its serving base station, and reports the obtained information to its serving base station (the first base station BS1). The serving base station combines reported information from connected user equipment in its serving area to obtain a collective view of communication resource use in other serving areas (e.g., neighboring cells). In this example, the first base station BS1 combines information it receives from the second user equipment UE2 with its own information to form a collective view of communication resources used by itself and by the second base station BS2 (e.g., a neighboring base station). For exemplary references related to flexible spectrum use, see PCT Application No. PCT/IB2009/007339 entitled "Priority-Based Fairness and Interference Signalling Technique in a Flexible Spectrum Use Wireless Communication System," to Lunden, et al., filed Nov. 5, 2009 and PCT Application No. PCT/IB2009/007340 entitled "Automated Local Spectrum Usage Awareness," to Lunden, et al., filed Nov. 5, 2009, which are incorporated herein by reference.

In a communication system that employs flexible spectrum use wherein frequency reuse is configured dynamically on a serving area (or cell) level, flexible spectrum use control is distributed among individual cells. Each cell reserves its own resources, and access on those resources is governed by a processor (e.g., resource manager 528 of the processor 520 illustrated in FIG. 5) in the respective base station. Signaling of communication resource reservations between neighboring cells is arranged, for example, using flexible spectrum use broadcast beacons from such access points or base stations, or using X2 or other direct communication links between the base stations.

Communication resource reservation on a cellular level can be used by a base station in a downlink ("DL") regardless of which user equipment is scheduled on the communication resource because interference caused to a neighboring cell's user equipment would be similar to interference that would be caused to user equipment operating within the base station's own served area, assuming fixed transmitter power on the reserved communication resource. However, in an uplink, the situation is different because the transmission originates from a different source that may be located anywhere within its cellular area depending on which user equipment is scheduled to transmit. As a result, the cell's communication resource reservation has to be allocated with worst-case uplink interference in mind and may end up being unduly restrictive.

As introduced herein, a base station (or access point) broadcasts information on reserved communication resources employing a time division duplex frame structure. It should be noted that the term "base station" and "access point" may be used interchangeably in accordance with the principles of the present application. The information can be transmitted, without limitation, in a system information broadcast or by point-to-point communication. A user equipment monitors the communication resource reservations of neighboring serving areas (or cells) and estimates path losses thereto. The user equipment may also obtain information describing the frame structure (e.g., time division duplex frame structure) of the neighboring cells. The user equipment then signals the obtained information to its serving base station.

The serving base station monitors the received information. The serving base station also measures or estimates the potential interference on uplink communication resources, even if those uplink communication resources are not reserved therefor (i.e., those communication resources are free or are reserved for other serving areas or cells). This can include observing variations in different subframes of a frame that may be due to potentially different switching points in a neighboring cell. The serving base station identifies whether a user equipment can use an uplink communication resource not reserved for the base station.

In accordance therewith, the serving base station computes an allowed user equipment transmitter power based on a path loss to another base station (e.g., a closest neighboring base station) using the communication resource so that the interference remains below an allowed level. The serving base station estimates achievable signal-to-interference-and-noise ratio ("SINR") based on uplink interference on the communication resource, and identifies subframes of the communication resource that are used for uplink in the cells that are potentially interfered. If the estimated SINR is high enough and there are suitable uplink subframes found (in the previous step), the user equipment can be scheduled on those communication resources that may not be allocated to the base station.

Instead of being restricted to operating only with communication resources that are reserved for the base station, it is possible for a base station to utilize additional communication resources when it does not significantly interfere with the serving area of another base station. To facilitate this, additional measurements and signaling may be employed that can determine when the base station can schedule a user equipment on an unreserved communication resource that may not be included in its inventory of reserved communication resources.

Figure 7:
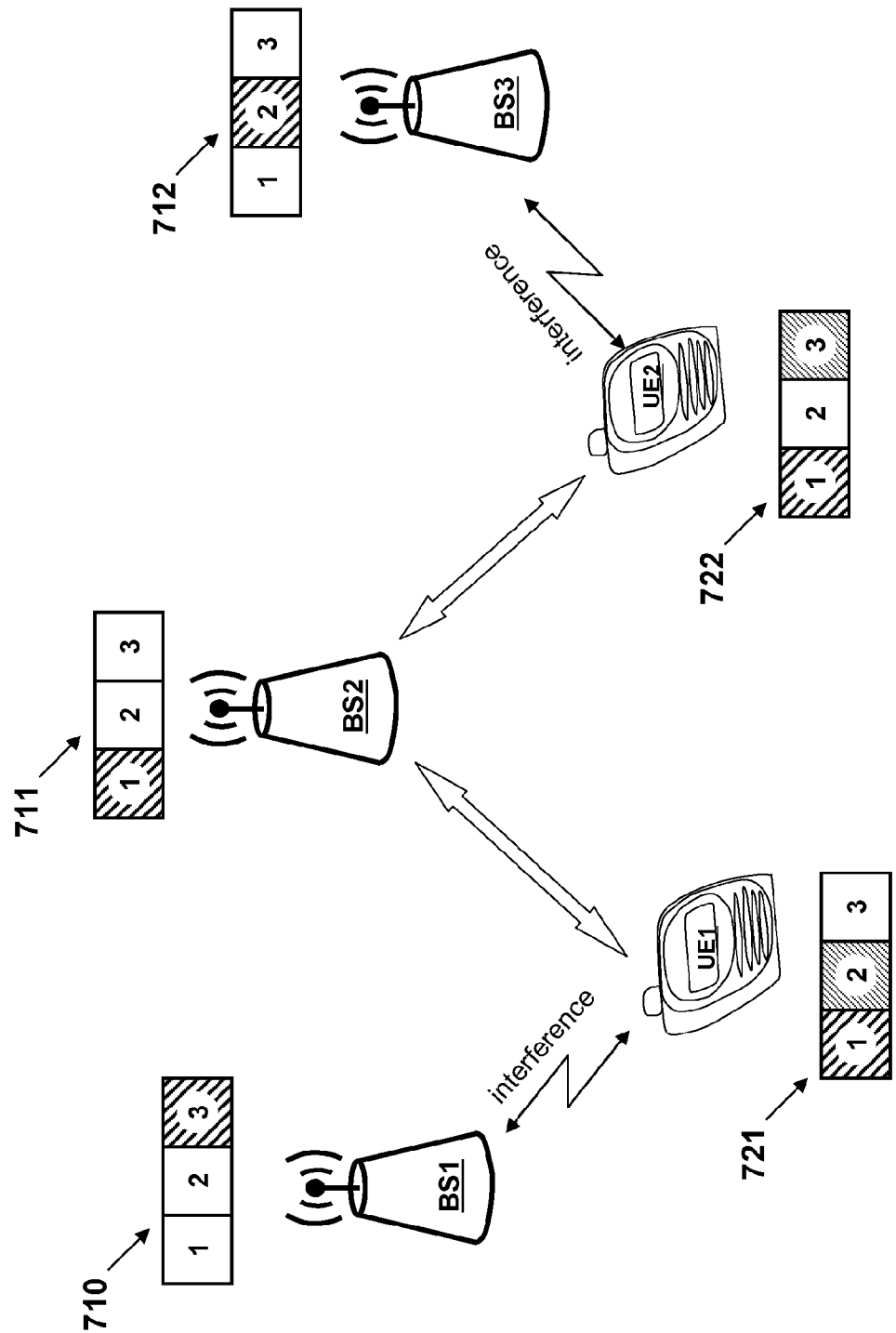
FIG. 7 illustrates a system level diagram of an embodiment of a communication system illustrating exemplary flexible spectrum use between user equipment and a base station according to the principles of the present invention.

Turning now to FIG. 7, illustrated is a system level diagram of an embodiment of a communication system illustrating exemplary flexible spectrum use between user equipment and a base station according to the principles of the present invention. In the illustrated embodiment, additional uplink communication resources are identified for use between a user equipment and a base station, and such communication resources may not be included in communication resources allocated to the base station. In this scenario, unreserved flexible spectrum use communication resources may be used for improving uplink capacity and efficiency. For simplicity of illustration, FIG. 7 does not consider a frame structure with a flexible time division duplex switching point. In FIG. 7, first, second and third base stations BS1, BS2, BS3 each have one flexible spectrum use communication resource unit reserved for its respective downlink and uplink use. Accordingly, the first base station BS1 has communication resource unit 3 reserved for its use in flexible spectrum use spectrum 710. The second base station BS2 has communication resource unit 1 reserved for its use in flexible spectrum use spectrum 711, and the third base station BS3 has communication resource unit 2 reserved for its use in flexible spectrum use spectrum 712.

The first and second user equipment UE1, UE2 are connected to the second base station BS2, and therefore communication resource unit 1 can be used for their respective uplink and downlink communication with their access point (i.e., the second base station BS2) as illustrated by flexible spectrum use spectrum 721. However, if the first base station BS1 covers the serving area close enough to be interfered by the uplink of the first user equipment UE1 (since the third base station BS3 is further away from the first user equipment UE1), there is a possibility for the first user equipment UE1 also to use communication resource unit 2 for its uplink without substantially interfering with any other serving area (or cell). Similarly, the second user equipment UE2 could use communication resource unit 3 for its uplink communication with the second base station BS2 as illustrated by flexible spectrum use spectrum 722. These communication resources do not need to be reserved by flexible spectrum use, as no communication element is impacted by their use.

In an implementation of flexible spectrum use according to the principles of the present invention, the user equipment gathers information from another serving area (such as a neighboring cell) including another base station serving the same. The user equipment may obtain reserved communication resources, a frame structure associated with the communication resources, a path loss from the user equipment to the another base station and an identification of the another base station. The information can be obtained, without limitation, from a broadcast message from the another base station such as from a system information broadcast ("SIB") message or from a flexible spectrum use-specific beacon or broadcast signalling received by a user equipment. The path loss to the neighboring base station may be estimated based on the received reference signal power from the neighboring base station.

The information gathered by the user equipment should be signaled to the serving base station. The information can be compressed, for instance, by triggering signaling of relevant changes in the content of the broadcast. Furthermore, some parameters to limit the cases can be signaled to the user equipment by the communication system (e.g., a minimum distance or path loss to another base station before a communication resource is considered for flexible spectrum use). The serving base station employs selected information to implement flexible spectrum use. The information may include received interference on unreserved communication resources, a time division duplex frame structure of the another serving area, a path loss from the user equipment to another serving area (or another base station), a path loss from the user equipment to the serving base station, a maximum allowed uplink interference to the another serving area (e.g., a path loss+power offset>90 decibels, where the power offset indicates the user equipment transmit power compared to a maximum or a reference user equipment transmit power), and the communication resources reserved by the another base station. This information may be received from the user equipment connected to it and/or measured by the serving base station during uplink subframes.

After the information is available to the serving base station, the base station can make a decision for each unreserved/unallocated communication resource for the user equipment. An exemplary procedure follows for each communication resource for the user equipment. First, a maximum allowed user equipment transmitter power is computed based on a path loss or distance to another base station (e.g., a closest neighboring base station) using a communication resource so that interference remains below an allowed level. Second, an achievable SINR is estimated based on uplink interference on the communication resource. Next, subframes of the communication resource are identified that are used for the uplink in the serving areas (or cells) that are potentially interfered. If the estimated SINR is high enough and there are suitable uplink subframes of the communication resource found (in the previous step), the user equipment can be scheduled on that unreserved communication resource. A resource manager of a processor of the serving base station can schedule the user equipment in its served area the communication resource in identified subframes. To use a similar procedure for downlink communication resources (allowing low-power transmission on unreserved communication resources) would employ signaling from another base station to indicate distances to the interfered user equipment in the serving area of the another base station.

Figure 8:
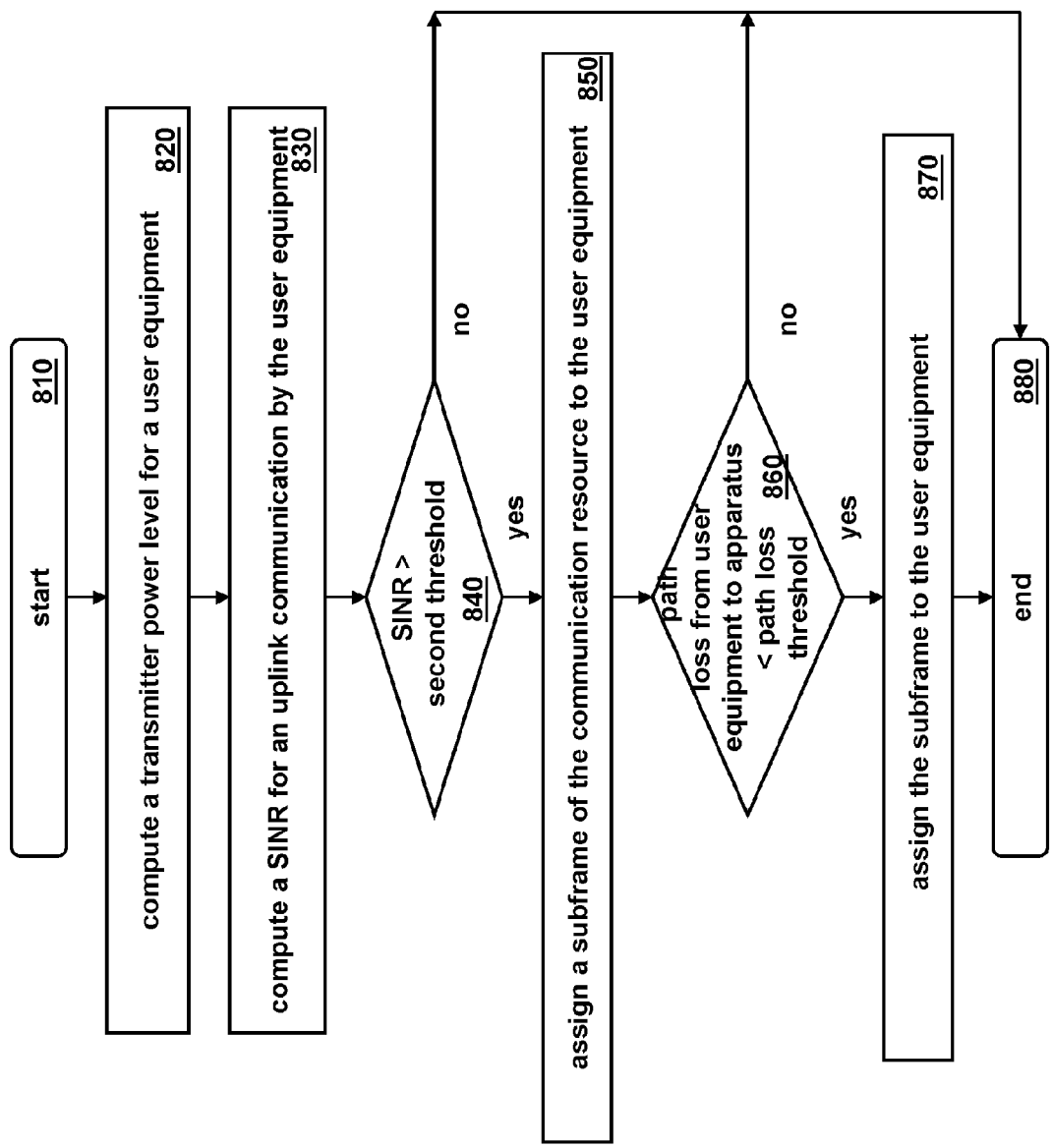
FIGS. 8 and 9 illustrate flow diagrams of embodiments of methods of operating a communication element in accordance with the principles of the present invention.

Turning now to FIG. 8, illustrated is a flow diagram of an embodiment of a method of operating a communication element in accordance with the principles of the present invention. In particular, the method demonstrates a base station or other apparatus in a communication system utilizing a communication resource or a portion thereof that may not be allocated to its inventory of communication resources. The method begins at step or module 810. In step or module 820, the base station computes a transmitter power level for a user equipment on a communication resource that is allocated to another base station (e.g., a neighboring base station). The computed transmitter power level would limit interference for communications in an area served by the neighboring base station below a first threshold level. The computed transmitter power level for the user equipment may be based on a path loss from the user equipment to the neighboring base station. The base station may be further configured to receive information about the communication resource and the subframe from the user equipment.

In step or module 830, the base station computes a SINR for an uplink communication by the user equipment to the base station employing the computed transmitter power level on the communication resource within an area served by the base station. The SINR for the uplink communication from the user equipment to the base station is dependent on a path loss from user equipment to the base station and interference observed on the communication resource. Interference observed by the base station may be interference measured or estimated by the base station. In step or module 840, the base station determines if the SINR is greater than a second threshold level. If the SINR is not greater than the second threshold level, the method ends in step or module 880. Otherwise, in step or module 850, the base station assigns at least a subframe of the communication resource to the user equipment. In step or module 860, the base station determines if a path loss from the user equipment to the base station is less than a path loss threshold. If the path loss from the user equipment to the base station is not less than the path loss threshold, the method ends in step or module 880. Otherwise, in step or module 870, the base station assigns the subframe to the user equipment. The method then ends in step or module 880.

Figure 9:
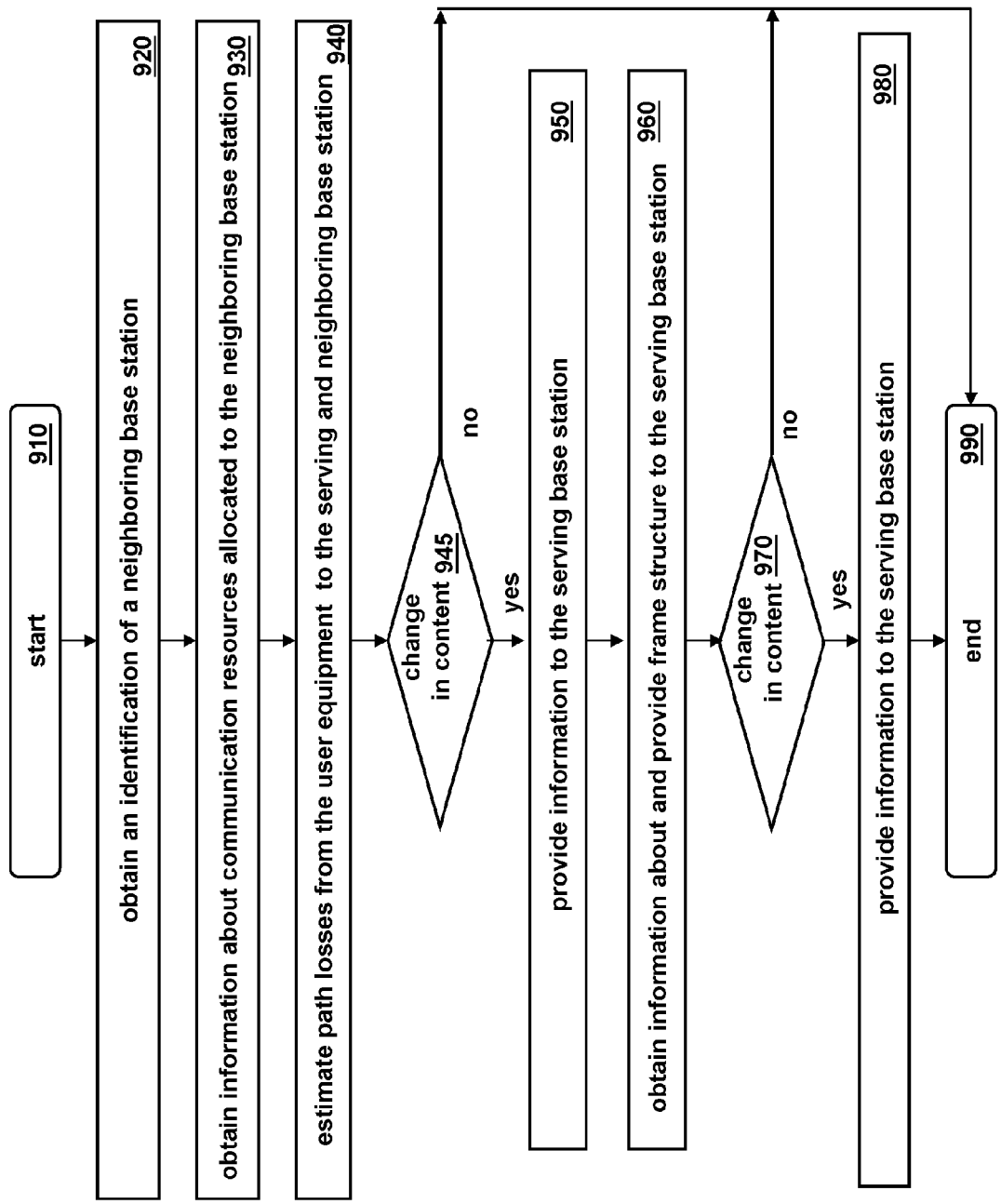

Turning now to FIG. 9, illustrated is a flow diagram of an embodiment of a method of operating a communication element in accordance with the principles of the present invention. In particular, the method demonstrates a user equipment or other apparatus in a communication system utilizing a communication resource or a portion thereof that may not be allocated to an inventory of communication resources of its serving base station. The method begins at step or module 910. In step or module 920, the user equipment obtains an identification ("ID") of another base station (e.g., a neighboring base station). In step or module 930, the user equipment obtains information about communication resources allocated to the neighboring base station. In step or module 940, the user equipment estimates path losses from the user equipment to its serving base station and to the neighboring base station. The aforementioned steps may be performed when a previously measured path loss to the neighboring base station is less than a threshold. In step or module 945, the user equipment determines if a change has occurred related to the information obtained above. If no change has occurred, the method ends in step or module 990. If a change has occurred, the user equipment provides the identification of the neighboring base station, the information about the communication resources allocated to the neighboring base station, and a path loss to the serving base station in step or module 950.

In step or module 960, the user equipment obtains information about a frame structure for the communication resources allocated to the neighboring base station and provides the frame structure to its serving base station. The user equipment may receive at least one of the identification of the neighboring base station, the information about the communication resources allocated to the neighboring base station, and the frame structure for communication resources allocated to the neighboring base station, without limitation, in a system information broadcast from the neighboring base station. The user equipment may receive any or all of the information and may estimate path losses from the user equipment to its serving base station and to the neighboring base station when the path loss to the neighboring base station is less than a threshold.

In step or module 970, the user equipment determines if a change has occurred for the identification of the neighboring base station, the information about communication resources allocated to the neighboring base station, or the estimated path losses from the user equipment to its serving base station and to a neighboring base station. If no change has occurred, the method ends in step or module 990. If a change has occurred, in step or module 980, the user equipment provides the identification of the neighboring base station, the information about the communication resources allocated to the neighboring base station, or the path losses to the serving and neighboring base stations to its serving base station. The method ends in step or module 990.

Thus, utilization of flexible spectrum use as introduced herein improves efficiency of communication system (such as cellular operation) by taking advantage of favorable positions of individual user equipment in a serving area. This can be advantageously accomplished by a base station without making separate communication resource reservations for those individual connections or user equipment. An apparatus, method and system are introduced herein to utilize a communication resource (or a portion) thereof that may not be included in the inventory of a serving base station in a communication system. In one embodiment, an apparatus (e.g., embodied in a user equipment) includes a processor and memory including computer program code. The memory and the computer program code are configured to, with the processor, cause the apparatus to obtain an identification of a neighboring base station, obtain information about communication resources allocated to the neighboring base station, estimate path losses from the user equipment to a serving base station and to the neighboring base station, and provide the identification of the neighboring base station, the information about the communication resources allocated to the neighboring base station, and the path losses to the serving base station. As should be understood in an exemplary embodiment, a neighboring base station includes base stations not serving a user equipment and is not limited to base stations adjacent the serving base station. An analogous principle applies to neighboring serving areas (and/or cells) to a serving area (or cell) for a particular user equipment.

In another embodiment, an apparatus (e.g., embodied in a base station) includes a processor and memory including computer program code. The memory and the computer program code are configured to, with the processor, cause the apparatus to compute a transmitter power level for a user equipment on a communication resource allocated to a neighboring base station to limit interference for communications in an area served by the neighboring base station below a first threshold level, and compute a signal-to-interference-and-noise ratio for an uplink communication by the user equipment employing the transmitter power level on the communication resource within an area served by the apparatus. The memory and the computer program code are further configured to, with the processor, cause the apparatus to assign a subframe of the communication resource to the user equipment if the signal-to-interference-and-noise ratio for the uplink communication is greater than a second threshold level. Although the apparatus, method and system described herein have been described with respect to cellular-based communication systems, the apparatus and method are equally applicable to other types of communication systems such as a WiMax® communication system.

Program or code segments making up the various embodiments of the present invention may be stored in a computer readable medium or transmitted by a computer data signal embodied in a carrier wave, or a signal modulated by a carrier, over a transmission medium. For instance, a computer program product including a program code stored in a computer readable medium may form various embodiments of the present invention. The "computer readable medium" may include any medium that can store or transfer information. Examples of the computer readable medium include an electronic circuit, a semiconductor memory device, a read only memory ("ROM"), a flash memory, an erasable ROM ("EROM"), a floppy diskette, a compact disk ("CD")-ROM, an optical disk, a hard disk, a fiber optic medium, a radio frequency ("RF") link, and the like. The computer data signal may include any signal that can propagate over a transmission medium such as electronic communication network communication channels, optical fibers, air, electromagnetic links, RF links, and the like. The code segments may be downloaded via computer networks such as the Internet, Intranet, and the like.

As described above, the exemplary embodiment provides both a method and corresponding apparatus consisting of various modules providing functionality for performing the steps of the method. The modules may be implemented as hardware (embodied in one or more chips including an integrated circuit such as an application specific integrated circuit), or may be implemented as software or firmware for execution by a computer processor. In particular, in the case of firmware or software, the exemplary embodiment can be provided as a computer program product including a computer readable storage structure embodying computer program code (i.e., software or firmware) thereon for execution by the computer processor.

Although the present invention and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof. Also, many of the features, functions and steps of operating the same may be reordered, omitted, added, etc., and still fall within the broad scope of the present invention.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An apparatus, comprising:
    a processor; and
    memory including computer program code,
    said memory and said computer program code configured to, with said processor, cause said apparatus to perform at least the following:
        compute a transmitter power level for a user equipment on a communication resource allocated to a neighboring base station to limit interference for communications in an area served by said neighboring base station below a first threshold level;

compute a signal-to-interference-and-noise ratio for an uplink communication by said user equipment employing said transmitter power level on said communication resource within an area served by said apparatus; and assign a subframe of said communication resource to said user equipment if said signal-to-interference-and-noise ratio for said uplink communication is greater than a second threshold level.

2. The apparatus as recited in claim 1 wherein said memory and said computer program code are further configured to, with said processor, cause said apparatus to assign said subframe of said communication resource to said user equipment if a path loss from said user equipment to said apparatus is less than a path loss threshold level.

3. The apparatus as recited in claim 1 wherein said memory and said computer program code are further configured to, with said processor, cause said apparatus to compute said transmitter power level for said user equipment on said communication resource based on a path loss to said neighboring base station.

4. The apparatus as recited in claim 1 wherein said memory and said computer program code are further configured to, with said processor, cause said apparatus to receive information about said communication resource and said subframe from said user equipment.

5. The apparatus as recited in claim 1 wherein said communication resource is not allocated to said apparatus.

6. The apparatus as recited in claim 1 wherein said signal-to-interference-and-noise ratio for said uplink communication is dependent on a path loss from said user equipment to said apparatus and interference on said communication resource observed by said apparatus.

7. A computer program product comprising a program code stored in a non-transitory computer readable medium configured to:

compute a transmitter power level for a user equipment on a communication resource allocated to a neighboring base station to limit interference for communications in an area served by said neighboring base station below a first threshold level;

compute a signal-to-interference-and-noise ratio for an uplink communication by said user equipment employing said transmitter power level on said communication resource within an area served by said apparatus; and assign a subframe of said communication resource to said user equipment if said signal-to-interference-and-noise ratio for said uplink communication is greater than a second threshold level.

8. A method, comprising:

computing a transmitter power level for a user equipment on a communication resource allocated to a neighboring base station to limit interference for communications in an area served by said neighboring base station below a first threshold level;

computing a signal-to-interference-and-noise ratio for an uplink communication by said user equipment employing said transmitter power level on said communication resource within an area served by said apparatus; and assigning a subframe of said communication resource to said user equipment if said signal-to-interference-and-noise ratio for said uplink communication is greater than a second threshold level.

9. The method as recited in claim 8 further comprising assigning said subframe of said communication resource to said user equipment if a path loss from said user equipment to a serving base station is less than a path loss threshold level.

10. The method as recited in claim 8 further comprising compute said transmitter power level for said user equipment on said communication resource based on a path loss to said neighboring base station.

11. The method as recited in claim 8 further comprising receiving information about said communication resource and said subframe from said user equipment.

12. The method as recited in claim 8 wherein said signal-to-interference-and-noise ratio for said uplink communication is dependent on a path loss from said user equipment to a serving base station and interference on said communication resource observed by said serving base station.

* * * * *